US008421013B2

(12) United States Patent
Baik et al.

(10) Patent No.: US 8,421,013 B2

(45) Date of Patent: Apr. 16, 2013

(54) ELECTROMAGNETIC WAVE TRANSMISSION FILTERS AND ELECTROMAGNETIC CAMERAS INCLUDING THE SAME

(75) Inventors: Chan-wook Baik, Yongin-si (KR); Seung-ho Bak, Seoul (KR); Jong-min Kim, Suwon-si (KR); Gun-sik Park, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 393 days.

(21) Appl. No.: 12/659,176

(22) Filed: Feb. 26, 2010

(65) Prior Publication Data

US 2011/0090025 A1 Apr. 21, 2011

(30) Foreign Application Priority Data

Oct. 16, 2009 (KR) ........................ 10-2009-0098777

(51) Int. Cl.
*G01J 1/00* (2006.01)

(52) U.S. Cl.
USPC ........................................................ 250/336.1

(58) Field of Classification Search ................ 250/336.1
See application file for complete search history.

(56) References Cited

U.S. PATENT DOCUMENTS

| | | | | |
|---|---|---|---|---|
| 4,856,042 | A * | 8/1989 | Staron et al. | 378/147 |
| 6,777,684 | B1 | 8/2004 | Volkov | |
| 2006/0109540 | A1* | 5/2006 | Kueks et al. | 359/321 |
| 2006/0109541 | A1 | 5/2006 | Osipov et al. | |
| 2007/0165295 | A1* | 7/2007 | Kim et al. | 359/245 |
| 2008/0239462 | A1 | 10/2008 | Kuekes et al. | |
| 2010/0327404 | A1* | 12/2010 | Smith et al. | 257/531 |

FOREIGN PATENT DOCUMENTS

| | | |
|---|---|---|
| JP | 2005-077673 | 3/2005 |
| JP | 2005-274329 | 10/2005 |
| KR | 10-1998-064756 | 10/1998 |
| KR | 10-2006-0126961 | 12/2006 |
| WO | WO 2006/055798 | 5/2006 |

OTHER PUBLICATIONS

European Search Report dated Mar. 17, 2011 issued in corresponding European Application No. 10167551.0.

Ming Li et al., "Transmission properties of composite metamaterials in the terahertz domain", *2008 Int'l Workshop on Metamaterials*, Piscataway, NJ, pp. 181-183 (Nov. 9, 2008).

Fumiaki Miyamaru et al., "Finite size effect of transmission property for metal hole arrays in subterahertz region", *App. Phys. Ltrs.*, Am. Inst. of Physics, Melville, NY, vol. 84, No. 15, pp. 2742-2744 (Apr. 12, 2004).

* cited by examiner

*Primary Examiner* — David Porta
*Assistant Examiner* — Hugh H Maupin
(74) *Attorney, Agent, or Firm* — Harness, Dickey & Pierce, P.L.C.

(57) ABSTRACT

An electromagnetic wave transmission filter may include a substrate and one or more coils. The one or more coils may be at least partly disposed in an opening through the substrate. An electromagnetic camera may include an electromagnetic wave detector array, including a plurality of detector cells for detecting electromagnetic waves, and an electromagnetic wave transmission filter disposed in front of the electromagnetic wave detector array to provide each of the detector cells with an electromagnetic wave of a certain wavelength. The electromagnetic wave transmission filter may includes a substrate and a plurality of coils. At least one of the plurality of coils may be at least partly disposed in each of a plurality of openings through the substrate.

23 Claims, 7 Drawing Sheets

ELECTROMAGNETIC WAVE TRANSMISSION FILTERS AND ELECTROMAGNETIC CAMERAS INCLUDING THE SAME

CROSS-REFERENCE TO RELATED APPLICATION(S)

This application claims priority from Korean Patent Application No. 10-2009-0098777, filed on Oct. 16, 2009, in the Korean Intellectual Property Office (KIPO), the entire contents of which are incorporated herein by reference.

BACKGROUND

1. Field

Example embodiments relate to electromagnetic wave transmission filters. Example embodiments also relate to electromagnetic cameras that may include the electromagnetic wave transmission filters. Additionally, example embodiments relate to filters that may selectively transmit electromagnetic waves of a narrow bandwidth around a certain wavelength and/or electromagnetic cameras including the filters.

2. Description of the Related Art

Recently, electromagnetic cameras, for example, terahertz cameras may have been widely used in various fields, such as, security checking, signal transmission, sample analyzing, and/or medical checkups. In general, electromagnetic cameras may images using electromagnetic waves at radio frequencies in the millimeter or sub-millimeter bandwidth instead of using light (e.g., visible light). In order to obtain an image of a certain wavelength in an electromagnetic camera, an electromagnetic wave transmission filter, that may transmit electromagnetic waves of a certain wavelength, may be disposed on a front portion of an electromagnetic wave detector array.

The electromagnetic wave transmission filter used in the electromagnetic camera may generally be formed with a slit in a metal plate, and/or may have a length that may be smaller than a wavelength of the electromagnetic wave to be transmitted through the electromagnetic wave transmission filter, or a circular opening in the metal plate, having a diameter that may be smaller than the wavelength of the electromagnetic wave. When the slit that may have the length smaller than the wavelength of the electromagnetic wave may be formed in the metal plate, the electromagnetic wave that may have a wavelength twice the length of the slit may be transmitted through the slit. However, in this case, a bandwidth of the wavelength of the electromagnetic wave that may be transmitted through the slit may be relatively large and/or the amount of transmitted electromagnetic wave may not exceed a transmission amount corresponding to a square of the slit area. In addition, when the circular opening that may have the diameter smaller than the wavelength may be formed in the metal plate, a wavelength selectivity of the transmitted electromagnetic wave may decrease and/or the amount of transmitted electromagnetic wave may be reduced in proportion to the fourth power of the diameter of the circular opening.

SUMMARY

Example embodiments may provide electromagnetic wave transmission filters that transmit electromagnetic waves having narrow wavelength bands and/or may transmit a large amount of the electromagnetic wave.

Example embodiments also may provide electromagnetic cameras including the electromagnetic wave transmission filters.

Additional aspects will be set forth in part in the description which follows and, in part, will be apparent from the description, and/or may be learned by practice of example embodiments.

According to example embodiments, an electromagnetic wave transmission filter may include a substrate, an opening penetrating through the substrate, and/or a spiral coil disposed in the opening.

The substrate may include a conductive material.

The opening may have a length that is smaller than a wavelength of an electromagnetic wave transmitted through the electromagnetic wave transmission filter.

The coil may be disposed so that a central axis of the coil is parallel to a surface of the substrate.

The coil may be disposed in the opening. The coil may have two ends. Both ends of the coil may be fixed onto the substrate via an edge or edges of the opening.

A plurality of coils may be disposed in the opening.

The coil may be disposed so that a central axis of the coil is perpendicular to a surface of the substrate.

The coil may be disposed in the opening. A supporting portion for supporting the coil may be formed across a center portion of the opening.

The coil may be disposed in the opening. An end of the coil may extend toward the edge or edges of the opening to be fixed to the substrate near the edge or edges of the opening.

A plurality of coils may be arranged along the edge or edges of the opening.

A plurality of openings may be formed in the substrate. At least one coil may be disposed in each of the openings.

According to example embodiments, an electromagnetic wave camera may include an electromagnetic wave detector array, including an array of a plurality of detector cells for detecting electromagnetic waves, and/or an electromagnetic wave transmission filter disposed in front of the electromagnetic wave detector array in order to provide each of the detector cells with an electromagnetic wave of a certain wavelength. The electromagnetic wave transmission filter may include a substrate, a plurality of openings penetrating through the substrate, and/or at least one spiral coil disposed in each of the plurality of openings.

The substrate may be divided into a plurality of substrate cells. An insulating layer may be disposed between adjacent substrate cells.

A plurality of openings and/or a plurality of coils may be aligned with each substrate cell.

According to example embodiments, an electromagnetic wave transmission filter may include a substrate and/or one or more coils. The one or more coils may be at least partly disposed in an opening through the substrate.

According to example embodiments, an electromagnetic camera may include an electromagnetic wave detector array and/or an electromagnetic wave transmission filter. The electromagnetic wave detector array may include a plurality of detector cells for detecting electromagnetic waves. The electromagnetic wave transmission filter may be disposed in front of the electromagnetic wave detector array to provide each of the detector cells with an electromagnetic wave of a certain wavelength. The electromagnetic wave transmission filter may include a substrate and/or a plurality of coils. At least one of the plurality of coils may be at least partly disposed in each of a plurality of openings through the substrate.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
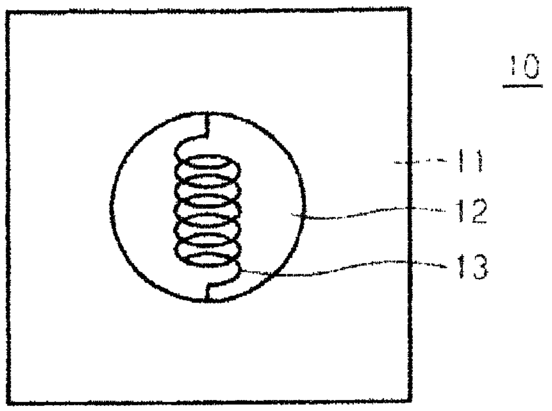
FIG. 1 is a front view of an electromagnetic wave transmission filter according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a front view of electromagnetic wave transmission filter 10 according to example embodiments. Referring to FIG. 1, electromagnetic wave transmission filter 10 may include substrate 11, opening 12 penetrating through substrate 11, and/or coil 13 formed at least partly in opening 12. Substrate 11 may be a conductive substrate. Coil 13 may be a conductive coil. Coil 13 may have a spiral shape.

Substrate 11 may be formed of a semiconductor wafer (e.g., a silicon wafer) and/or may be formed of metal material. Opening 12 may penetrate through conductive substrate 11. Opening 12 may have a size that is smaller than a wavelength of electromagnetic waves transmitted through electromagnetic wave transmission filter 10. For example, if opening 12 is circular, only incident electromagnetic waves having wavelengths smaller than a diameter of opening 12 may be transmitted through electromagnetic wave transmission filter 10. Opening 12 shown in FIG. 1 is circular, however, the shape of opening 12 may not be limited thereto. For example, opening 12 may be oval, rectangular, square, or some other polygonal shape(s).

Referring to FIG. 1, coil 13 may be disposed in opening 12. Coil 13 may have two ends. Both ends of coil 13 may be fixed on substrate 11 via an edge or edges of opening 12. For example, coil 13 may be electrically connected to substrate 11. Coil 13 may be formed as a spiral that is wound at least once. Coil 13 may be formed so that a central axis of coil 13 may be parallel to a surface of substrate 11. Coil 13 may be fabricated separately from substrate 11 and then may be coupled to the substrate 11. However, because electromagnetic wave transmission filter 10 may be used to transmit electromagnetic waves at a radio frequency, for example, a terahertz bandwidth, coil 13 may have a height less than 1 mm (e.g., tens to hundreds of micrometers). As a result, it may be difficult to fix coil 13 to substrate 11. When coil 13 of such a fine thickness may be required, coil 13 may be grown directly on substrate 11. For example, a nano-wire, such as carbon nano-tube (CNT), may be grown like a coil under certain conditions. Therefore, a nano-coil may be directly grown on substrate 11.

In the above structure, when the electromagnetic wave having a wavelength of a wide bandwidth is incident on electromagnetic wave transmission filter 10 of FIG. 1, the electromagnetic wave having a certain wavelength and/or polarization may be resonated in coil 13 due to an electromagnetic induction operation of coil 13. The resonant wavelength may depend, for example, on the number of windings in coil 13, pitches between wound coil 13, the size of coil 13, an area of opening 12, and/or a shape of opening 12. The example embodiment of FIG. 1 may be modeled as a cylindrical conductive ring in which coil 13 is disposed. In this case, the resonant wavelength may become longer than the resonant wavelength of coil 13 itself. Due to the resonance, an electromagnetic wave having a wavelength corresponding only to the resonant wavelength may be transmitted through electromagnetic wave transmission filter 10. As described above, since the resonance is generated in coil 13, a selectivity of electromagnetic wave transmission filter 10 with respect to a certain wavelength may be improved. In addition or in the alternative, the amount of the electromagnetic wave of a certain wavelength that may be transmitted through electromagnetic wave transmission filter 10 may correspond to an amount of the electromagnetic wave of the certain wavelength that would be transmitted through an opening with a cross-sectional area a few times greater than a cross-sectional area of opening 12.

Figure 2:
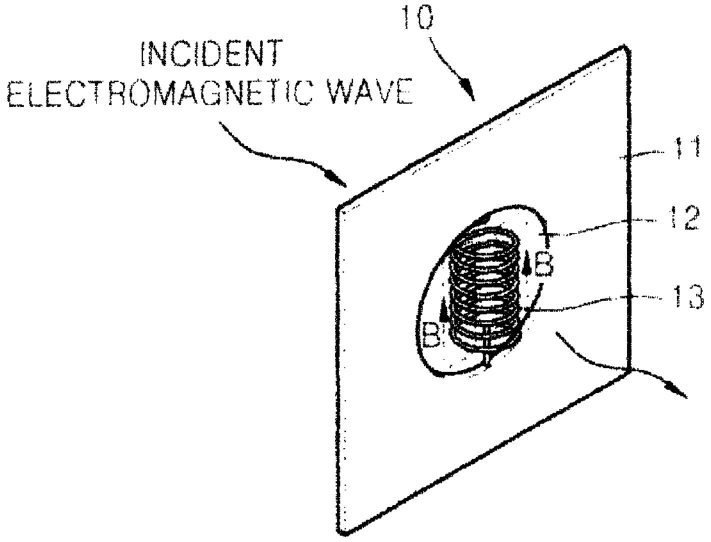
FIG. 2 is a perspective view illustrating operation of the electromagnetic wave transmission filter of FIG. 1.

FIG. 2 is a perspective view illustrating operation of electromagnetic wave transmission filter 10 of FIG. 1. Referring to FIG. 2, the electromagnetic wave may be incident on electromagnetic wave transmission filter 10 while proceeding from a left side of the drawing toward a right side of the drawing. Then, the resonant phenomenon may occur in coil 13. The electromagnetic wave having the wavelength corresponding to the resonant wavelength may transmit through electromagnetic wave transmission filter 10. Since a central axis of coil 13 may be parallel to the surface of substrate 11, the electromagnetic wave whose magnetic field direction may coincide with the central axis of coil 13 (e.g., the electromagnetic wave whose magnetic field direction is parallel with the surface of substrate 11) may be the only contributor to the resonance. Then, the electromagnetic wave transmitted through electromagnetic wave transmission filter 10 may only have the magnetic field component that is parallel with the surface of substrate 11. In this point of view, electromagnetic wave transmission filter 10 of FIG. 1 may perform as a polarization filter that transmits the electromagnetic wave having a certain polarization component among the incident electromagnetic waves that may have the resonant wavelength.

Figure 3:
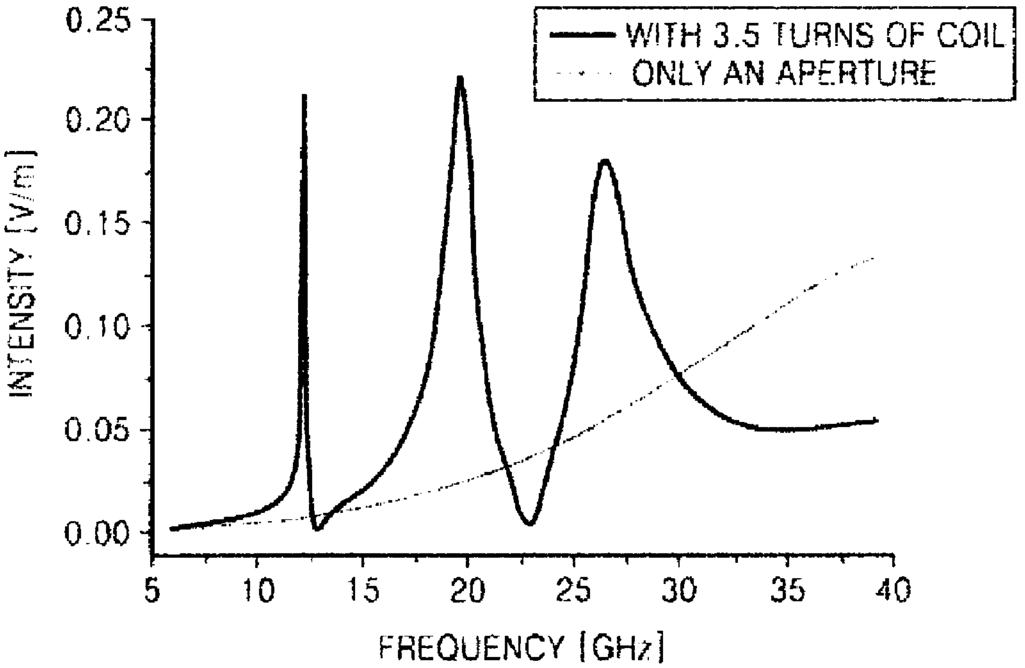
FIG. 3 is a simulation graph illustrating an intensity of electromagnetic waves transmitted through the electromagnetic wave transmission filter of FIG. 1 versus the intensity of electromagnetic waves transmitted through a filter having no coil.

FIG. 3 is a graph showing a result of simulating characteristics of electromagnetic wave transmission filter 10 of FIG. 1. In the graph of FIG. 3, the thick solid line may denote an intensity of the electromagnetic waves transmitted through electromagnetic wave transmission filter 10 versus frequency when coil 13 that is wound 3.5 times may be disposed in the opening 12. The solid line may denote an intensity of the electromagnetic waves transmitted through electromagnetic wave transmission filter 10 versus frequency when coil 13 is not disposed in opening 12. When coil 13 is disposed in the opening 12, the electromagnetic wave may have peaks at frequencies corresponding to multiples of a certain frequency due to the resonance phenomenon. On the other hand, when coil 13 is not disposed in opening 12, the intensity of the transmitted electromagnetic wave may increase as the frequency may increase, that is, as the wavelength may be reduced.

Figure 4:
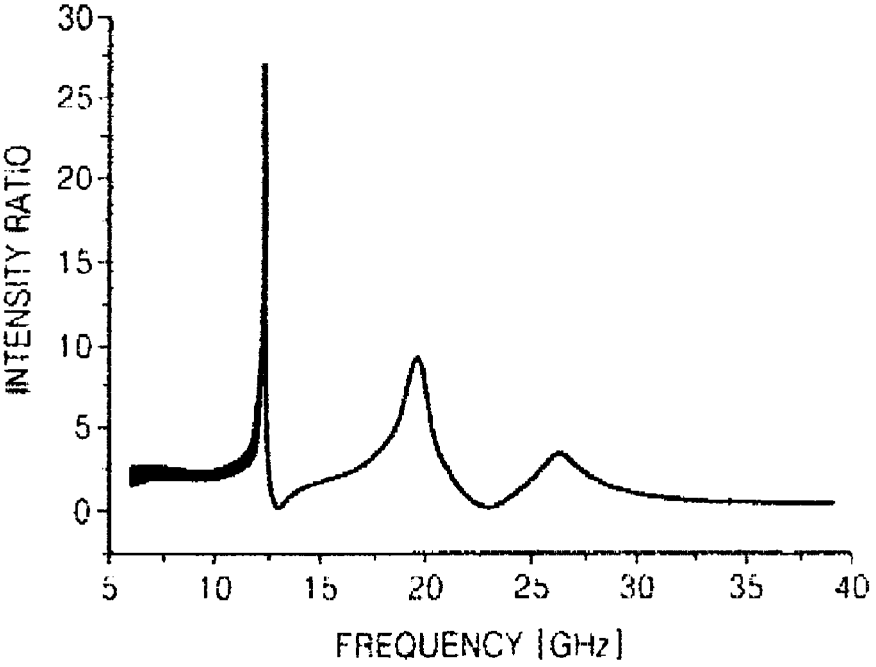
FIG. 4 is a simulation graph, based on the simulation characteristics of FIG. 3, illustrating a ratio of the intensity of the electromagnetic waves transmitted through the electromagnetic wave transmission filter having a coil to the intensity of the electromagnetic waves transmitted through the electromagnetic wave transmission filter having no coil.

FIG. 4 is a graph, based on the simulation characteristics of FIG. 3, illustrating a ratio of the intensity of the electromagnetic waves transmitted through electromagnetic wave transmission filter 10 when coil 13 is disposed in opening 12 to the intensity of the electromagnetic waves through the electromagnetic wave transmission filter 10 when coil 13 is not disposed in opening 12. That is, the graph of FIG. 4 is a result of dividing the thick solid line graph of FIG. 3 by the thin solid line graph of FIG. 3. Referring to FIG. 4, the intensity ratio may increase as the frequency may become lower, that is, as the wavelength may increase. Therefore, the effect of coil 13 may be more significant lower frequencies. FIGS. 3 and 4 are graphs in a frequency range greater than about 5 GHz and less than about 40 GHz. However, electromagnetic wave transmission filter 10 is not limited to the above frequency range. As described above, electromagnetic wave transmission filter 10 may be designed to transmit only a certain frequency within various frequency ranges by appropriately selecting, for example, the number of windings in coil 13, the pitch between coil 13, the size of coil 13, and/or the size and/or shape of opening 12.

Figure 5A:
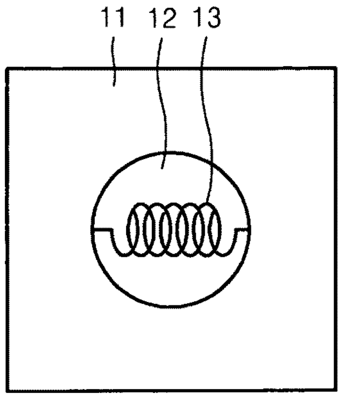
FIGS. 5A and 5B are front views of electromagnetic wave transmission filters according to example embodiments.
Figure 5B:
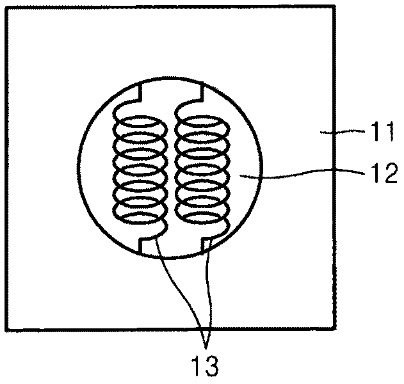

In FIG. 1, a basic structure of disposing coil 13 is shown. However, coil 13 may be disposed in other ways. FIGS. 5A and 5B are front views of electromagnetic wave transmission filters according to example embodiments. Referring to FIG. 5A, coil 13 may be rotated by 90° on the surface of substrate 11. In this case, the electromagnetic wave that may be transmitted through the electromagnetic wave transmission filter of FIG. 5A may have a polarization direction that is perpendicular to that of the electromagnetic wave that may be transmitted through electromagnetic wave transmission filter 10 of FIG. 1. In addition, referring to FIG. 5B, plurality of coils 13 may be disposed in opening 12.

Figure 6:
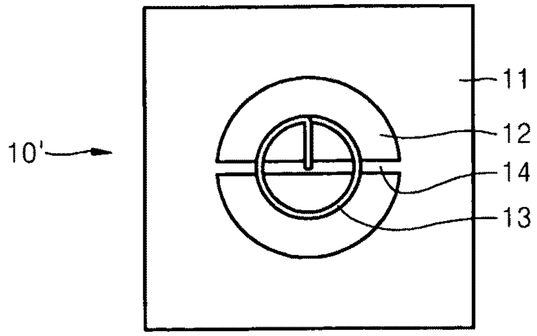
FIG. 6 is a front view of an electromagnetic wave transmission filter according to example embodiments.

FIG. 6 is a front view of electromagnetic wave transmission filter 10' according to example embodiments. Electromagnetic wave transmission filter 10' may be similar to or the same as electromagnetic wave transmission filter 10 of FIG. 1 in that coil 13 may be disposed in opening 12. However, electromagnetic wave transmission filter 10' may be different from electromagnetic wave transmission filter 10 of FIG. 1 in that coil 13 may be disposed so that a central axis of coil 13 may be perpendicular to the surface of substrate 11. Supporting portion 14 may be formed across the center portion of opening 12 in order to dispose coil 13 so that the central axis of coil 13 may be perpendicular to the surface of substrate 11 in opening 12. Coil 13 may be coupled on supporting portion 14. Supporting portion 14 may be formed of material that is similar to or the same as the material of substrate 11. In addition, as described above, when a fine nano-coil is used as coil 13, the nano-coil may be, for example, directly grown on supporting portion 14.

Figure 7:
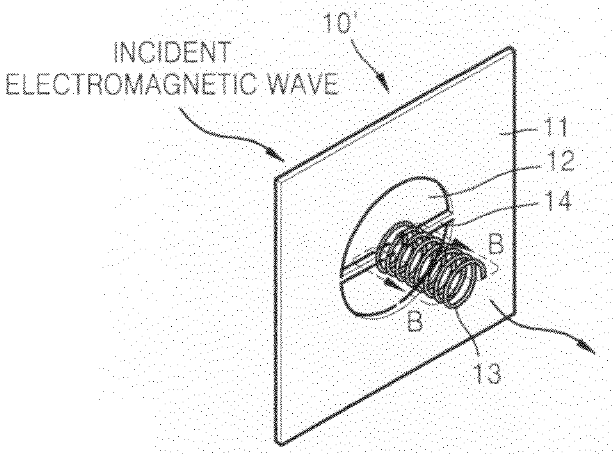
FIG. 7 is a perspective view illustrating operation of the electromagnetic wave transmission filter of FIG. 6.

FIG. 7 is a perspective view illustrating operation of electromagnetic wave transmission filter 10' of FIG. 6. Referring to FIG. 7, the incident electromagnetic wave may proceed from a left side of electromagnetic wave transmission filter 10' of FIG. 7 to a right side of electromagnetic wave transmission filter 10' to be incident into electromagnetic wave transmission filter 10'. Then, as described above, a resonant phenomenon may occur in coil 13, and/or only the electromagnetic wave having the wavelength corresponding to the resonant wavelength may be transmitted through electromagnetic wave transmission filter 10'. In example embodiments, since coil 13 may be disposed so that the central axis of coil 13 may be perpendicular to the surface of substrate 11, only the electromagnetic wave, whose magnetic field direction may coincide with the central axis of coil 13 (e.g., the electromagnetic wave whose magnetic field direction may be perpendicular to the surface of substrate 11) may contribute to the resonance. The electromagnetic wave that is transmitted through electromagnetic wave transmission filter 10' may only have the magnetic field component that may be perpendicular to the surface of substrate 11. Therefore, electromagnetic wave transmission filter 10' of FIG. 10 may perform as a polarization filter that may only transmit the electromagnetic wave having the magnetic field component perpendicular to the surface of substrate 11 among the incident electromagnetic waves.

Figure 8A:
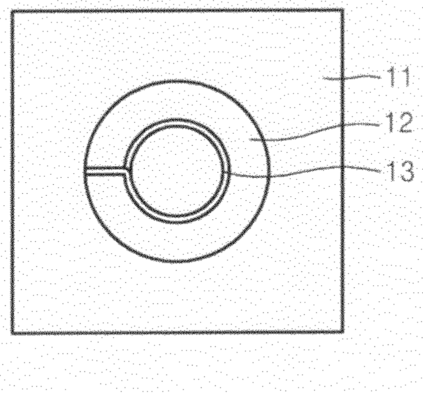
FIGS. 8A and 8B are front views of electromagnetic wave transmission filters according to example embodiments.
Figure 8B:
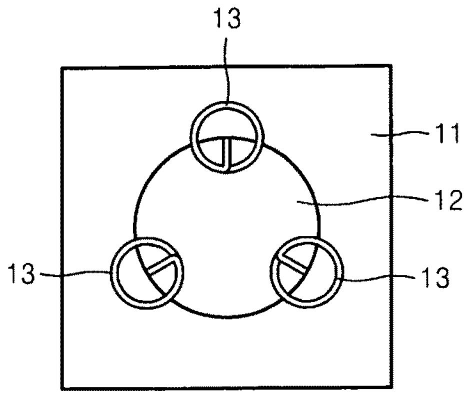

FIGS. 8A and 8B are front views of electromagnetic wave transmission filters according to example embodiments. In the electromagnetic wave transmission filter of FIG. 8A, coil 13 that may be disposed perpendicular to the surface of substrate 11 may be disposed in opening 12. However, supporting portion 14 crossing the center portion of opening 12 may not be formed. Thus, in the electromagnetic wave transmission filter of FIG. 8A, an end portion of coil 13 may extend toward the edge of opening 12 to be fixed to substrate 11 around the edge of opening 12. In addition, in the electromagnetic wave transmission filter of FIG. 8B, plurality of coils 13, that may be disposed to be perpendicular to the surface of substrate 11, may be disposed along the edge or edges of opening 12. For example, plurality of coils 13 may be disposed at a constant interval.

Figure 9A:
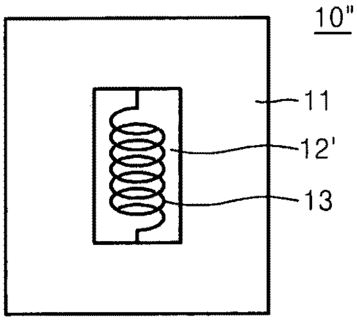
FIGS. 9A through 9E are front views of electromagnetic wave transmission filters according to example embodiments.
Figure 9B:
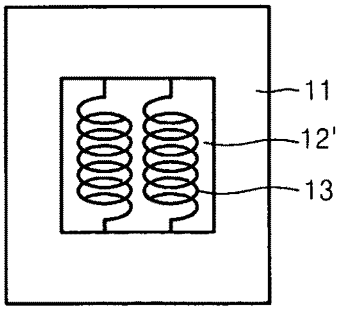
Figure 9C:
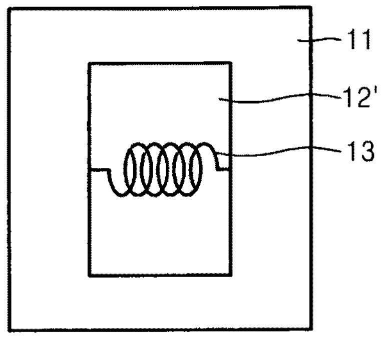
Figure 9D:
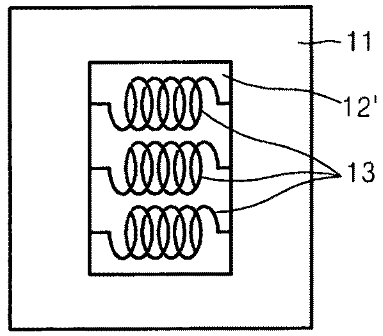
Figure 9E:
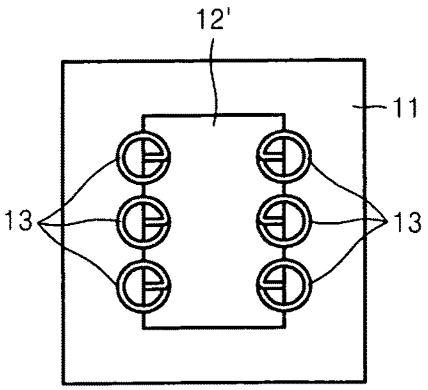

In the above description, opening 12 may be circular. However, as described above, opening 12 may be oval, rectangular, square, or some other polygon shape(s). FIGS. 9A through 9E schematically are front views of electromagnetic wave transmission filters according to example embodiments. Electromagnetic wave transmission filter 10" of FIG. 9A may include a rectangular-shaped opening 12' in which coil 13 may be disposed to be parallel with the surface of substrate 11. Rectangular-shaped opening 12' may be, for example, square-shaped. In FIG. 9B, plurality of coils 13, that may be disposed in parallel with the surface of substrate 11, may be disposed in rectangular-shaped opening 12'. In FIG. 9C, coil 13, that may be disposed in parallel with the surface of substrate 11, may be arranged in a shorter-side direction of rectangular-shaped opening 12'. In FIG. 9D, plurality of coils 13, that may be disposed in parallel with the surface of substrate 11, may be arranged in a direction of the short sides of rectangular-shaped opening 12'. In FIG. 9E, the plurality of coils 13, that may be disposed perpendicular to the surface of substrate 11, may be arranged along an edge or edges of rectangular-shaped opening 12'.

The above-described electromagnetic wave transmission filter 10, 10', or 10" may selectively transmit the electromagnetic waves of a certain wavelength by generating resonance through coil 13. Then, the intensity of the electromagnetic waves of the certain wavelength that may be transmitted through electromagnetic wave transmission filter 10, 10' or 10" may increase. Therefore, when electromagnetic wave transmission filter 10, 10', or 10" may be used in the electromagnetic camera, such as the terahertz camera, sensitivity and/or resolution of the electromagnetic camera may be improved.

Figure 10:
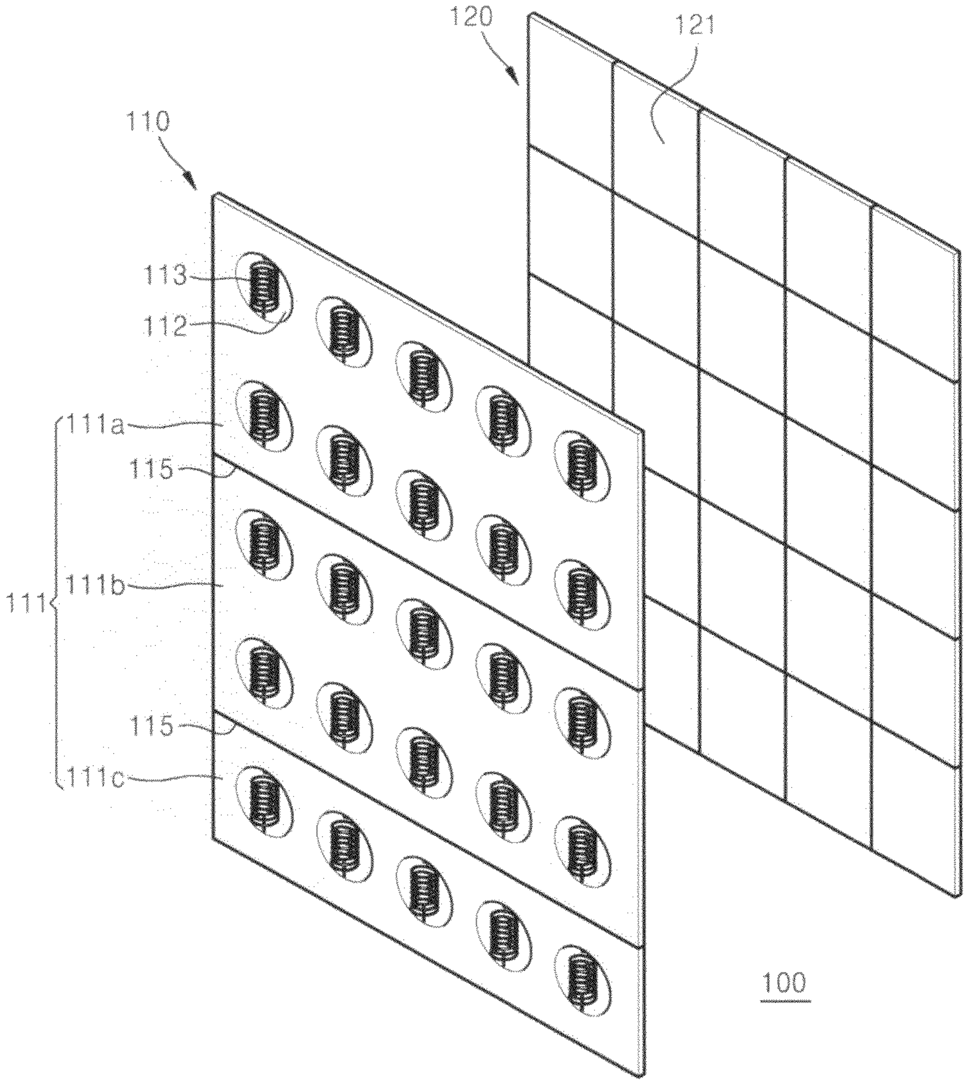
FIG. 10 is a diagram of an electromagnetic camera, including an electromagnetic wave transmission filter and an electromagnetic wave detector array, according to example embodiments.

FIG. 10 is a diagram of an electromagnetic camera, including an electromagnetic wave transmission filter and an electromagnetic wave detector array, according to example embodiments. FIG. 10 exemplary shows electromagnetic camera 100 including electromagnetic wave transmission filter 10, 10', or 10".

Referring to FIG. 10, electromagnetic camera 100 may include electromagnetic wave transmission filter 110 and/or electromagnetic wave detector array 120. As shown in FIG. 10, electromagnetic wave transmission filter 110 may be disposed in front of electromagnetic wave detector array 120 in order to provide electromagnetic wave detector array 120 with the electromagnetic wave of a certain wavelength. Here, electromagnetic wave detector array 120 may include plurality of detector cells 121. Plurality of detector cells 121 may be, for example, in an array.

In addition, electromagnetic wave transmission filter 110 may also include plurality of openings 112 and/or plurality of coils 113 corresponding to plurality of detector cells 121. Coils 113 may be conductive coils. Coils 113 may have spiral shapes. Plurality of openings 112 may have different sizes and/or shapes from each other. Plurality of coils 113 may have different number of windings, pitches, and/or sizes from each other. As a result, electromagnetic waves of different wavelengths may be transmitted through openings 112 and/or coils 113. In the above structure, each of detector cells 121 may detect the electromagnetic waved provided by corresponding opening 112 and/or coil 113 of electromagnetic wave transmission filter 110.

On the other hand, when the electromagnetic wave may be incident to electromagnetic wave transmission filter 110, an induction current may be generated on a surface of substrate 111. Substrate 111 may be a conductive substrate. In order to minimize the influence of the induction current formed on substrate 111 to resonant wavelengths of adjacent openings 112 and/or coils 113, substrate 111 may be divided into a plurality of substrate cells 111*a*, 111*b*, and 111*c*. In addition, insulating layers 115 may be disposed between adjacent substrate cells 111*a*, 111*b*, and/or 111*c*. Referring to FIG. 10, plurality of openings 112 and/or plurality of coils 113 may be arranged in two or more of substrate cells 111*a*, 111*b*, and 111*c*. However, only one opening 112 and/or one coil 113 may be disposed in substrate cells 111*a*, 111*b*, and/or 111*c*. The number of openings 112 and/or coils 113 disposed in one substrate cell 111*a*, 111*b*, or 111*c* may be appropriately selected in consideration of the degree of the influence of the induction current to the resonant wavelengths of the adjacent openings and/or coils 113, and/or fabrication costs of substrate 111.

In addition, in FIG. 10, one opening 112 and/or one coil 113 may correspond to each of detector cells 121. However, plurality of openings 112 and/or plurality of coils 113 may be aligned with each of detector cells 121 in order to narrow the bandwidth of the wavelength of the electromagnetic wave incident in detector cell 121 and/or to increase the intensity of the incident electromagnetic wave.

While example embodiments have been particularly shown and described, it will be understood by those of ordinary skill in the art that various changes in form and details may be made therein without departing from the spirit and scope of the present invention as defined by the following claims.

What is claimed is:

1. An electromagnetic wave transmission filter, comprising:

a substrate; and one or more coils;

wherein the one or more coils are at least partly disposed in an opening through the substrate, and wherein the substrate comprises conductive material.

2. The electromagnetic wave transmission filter of claim 1, wherein the opening has a length that is smaller than a wavelength of an electromagnetic wave transmitted through the electromagnetic wave transmission filter.

3. The electromagnetic wave transmission filter of claim 1, wherein the one or more coils are disposed so that a central axis of the one or more coils are parallel to a surface of the substrate.

4. The electromagnetic wave transmission filter of claim 1, wherein the one or more coils include two ends, and wherein the two ends are fixed to the substrate at an edge or edges of the opening.

5. The electromagnetic wave transmission filter of claim 1, wherein the one or more coils includes a plurality of coils, and wherein the plurality of coils are at least partly disposed in the opening.

6. The electromagnetic wave transmission filter of claim 1, wherein the one or more coils are disposed so that a central axis of the one or more coils is perpendicular to a surface of the substrate.

7. The electromagnetic wave transmission filter of claim 1, wherein a supporting portion for the one or more coils is formed across a center portion of the opening.

8. The electromagnetic wave transmission filter of claim 1, wherein an end of the one or more coils extends toward an edge of the opening to be fixed to the substrate near the edge of the opening.

9. The electromagnetic wave transmission filter of claim 1, wherein the one or more coils includes a plurality of coils, and wherein the plurality of coils are disposed along an edge or edges of the opening.

10. The electromagnetic wave transmission filter of claim 1, wherein the one or more coils includes a plurality of coils, wherein the substrate includes a plurality of openings through the substrate, and wherein at least one coil of the plurality of coils is disposed in each of the openings.

11. An electromagnetic camera, comprising:

an electromagnetic wave detector array, including a plurality of detector cells for detecting electromagnetic waves; and an electromagnetic wave transmission filter disposed in front of the electromagnetic wave detector array to provide each of the detector cells with an electromagnetic wave of a certain wavelength;

wherein the electromagnetic wave transmission filter includes:

a substrate; and a plurality of coils;

wherein at least one of the plurality of coils is at least partly disposed in each of a plurality of openings through the substrate, and wherein the substrate comprises conductive material.

12. The electromagnetic camera of claim 11, wherein each of the openings has a length that is smaller than a wavelength of an electromagnetic wave transmitted through the electromagnetic wave transmission filter.

13. The electromagnetic camera of claim 11, wherein the at least one of the plurality of coils is disposed so that a central axis of the at least one of the plurality of coils is parallel to a surface of the substrate.

14. The electromagnetic camera of claim 13, wherein the at least one of the plurality of coils includes two ends, and wherein the two ends are fixed to the substrate at an edge or edges of a respective opening.

15. The electromagnetic camera of claim 11, wherein two or more of the plurality of coils are at least partly disposed in each of the plurality of openings.

16. The electromagnetic camera of claim 11, wherein the at least one of the plurality of coils is disposed so that a central axis of the at least one of the plurality of coils is perpendicular to a surface of the substrate.

17. The electromagnetic camera of claim 11, wherein a supporting portion for the at least one of the plurality of coils is formed across a center portion of a respective opening.

18. The electromagnetic camera of claim 11, wherein an end of the at least one of the plurality of coils extends toward an edge of a respective opening to be fixed to the substrate near the edge of the respective opening.

19. The electromagnetic camera of claim 11, wherein two or more of the plurality of coils are disposed along an edge or edges of each of the plurality of openings.

20. The electromagnetic camera of claim 11, wherein the substrate is divided into a plurality of substrate cells, and wherein an insulating layer is disposed between adjacent substrate cells.

21. The electromagnetic camera of claim 20, wherein each of the substrate cells includes:

one or more of the openings through the substrate; and one or more of the at least one of the plurality of coils at least partly disposed in each of the openings.

22. An electromagnetic wave transmission filter, comprising:

a substrate; and one or more coils;

wherein the one or more coils are at least partly disposed in an opening through the substrate, and wherein the opening has a length that is smaller than a wavelength of an electromagnetic wave transmitted through the electromagnetic wave transmission filter.

23. The electromagnetic wave transmission filter of claim 22, wherein the one or more coils includes a plurality of coils, and wherein the plurality of coils are at least partly disposed in the opening.

* * * * *